(12) United States Patent
Valdivia et al.

(10) Patent No.: US 9,559,901 B2
(45) Date of Patent: Jan. 31, 2017

(54) SYSTEMS AND METHODS FOR REMOTE DEVICE CONFIGURATION

(71) Applicant: Google Inc., Mountain View, CA (US)

(72) Inventors: Carlos Valdivia, Mountain View, CA (US); William Bennett Brockman, Newton, MA (US); Jhilmil Jain, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 651 days.

(21) Appl. No.: 13/918,073

(22) Filed: Jun. 14, 2013

(65) Prior Publication Data

US 2014/0372574 A1   Dec. 18, 2014

(51) Int. Cl.
*G06F 15/16* (2006.01)
*H04L 12/24* (2006.01)

(52) U.S. Cl.
CPC ....... *H04L 41/0806* (2013.01); *H04L 41/0846* (2013.01)

(58) Field of Classification Search
CPC ...................................... H04L 41/08–41/0816
See application file for complete search history.

(56) References Cited

U.S. PATENT DOCUMENTS

| 8,713,635 | B2* | 4/2014 | Iga | 709/249 |
| 2003/0040363 | A1* | 2/2003 | Sandberg | G07F 17/32 463/42 |
| 2008/0109535 | A1* | 5/2008 | McCue | G06Q 10/10 709/220 |
| 2014/0188676 | A1* | 7/2014 | Marmolejo-Meillon | H04L 41/0809 705/34 |
| 2014/0281493 | A1* | 9/2014 | Nakhjiri | H04L 9/321 713/155 |

* cited by examiner

*Primary Examiner* — Brendan Higa
(74) *Attorney, Agent, or Firm* — Troutman Sanders LLP; James E. Schutz; Scott D. Barnett (57) ABSTRACT

Systems and methods for remote device configuration is provided. In one embodiment, a method comprises outputting, from a computer, to a first computing device, configuration options for a second computing device; receiving, at the computer, from the first computing device, configuration data associated with the configuration options for the second computing device; associating a first security identifier with the configuration data for the second computing device; and in response to a request for the configuration data for the second computing device, outputting, from the computer, to the second computing device, the configuration data for the second computing device.

16 Claims, 5 Drawing Sheets

SYSTEMS AND METHODS FOR REMOTE DEVICE CONFIGURATION

BACKGROUND

Network service providers provide various wireless or wireline network services such as Internet access to their subscribers. Further, network service providers typically provide the infrastructure equipment such as base stations, routers or access points to allow their subscribers to use computing devices such as cellular phones, laptops or tablets to access and use their networks. In a typical business model, a network service provider purchases computing equipment from multiple manufacturers and then sells the computing equipment directly to consumers. Once purchased by a subscriber, the network service provider will provision the computing equipment to allow the subscriber to operate the equipment on its network.

Furthermore, the subscriber has to configure the computing device, which typically varies based on the manufacturer or the type of computing device. A subscriber may configure the computing device by, for instance, configuring Internet connectivity, adding a user account, establishing backup capability, adding applications, providing payment details, personalizing the device and the like. While "set-up wizards" may have reduced some of the complexity of performing these tasks, these tasks continue to be a technical challenge to a lay user, difficult to perform on smaller devices, and time consuming. Further, once the computing device is configured, the configuration data is typically stored locally and not re-usable. Accordingly, there is a need for techniques to allow for remote device configuration to, for instance, reduce the complexity and duration of performing the configuration tasks while allowing for remote storage and re-use of the device's configuration. Furthermore, other desirable features and characteristics of the present disclosure will become apparent from the subsequent detailed description and claims, taken in conjunction with the accompanying figures and the foregoing technical field and background.

SUMMARY OF THE DISCLOSURE

The subject innovation relates to methods, devices, systems, or articles of manufacture for remote device configuration. In one example embodiment, a computer such as a server may output, to a first computing device, configuration options for a second computing device. Further, the computer may receive, from the first computing device, configuration data associated with the configuration options for the second computing device. The computer may associate a first security identifier with the configuration data for the second computing device. Finally, in response to a request for the configuration data for the second computing device, the computer may output, to the second computing device, the configuration data for the second computing device.

BRIEF DESCRIPTION OF THE FIGURES

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION

This disclosure provides example methods, devices, systems, or articles of manufacture for remote device configuration. In one example, a laptop may access a computer such as a server via a web page to pre-configure settings of a cellular phone. The computer may provide, via its web page, configuration options for the cellular phone. A user of the laptop may use the configuration options to provide configuration data for the cellular phone. Furthermore, the computer may require that a user provide a pin for the cellular phone via the web page. Upon receiving the cellular phone, a user may need to set the cellular phone's network configuration to allow it to establish a connection with the computer via the Internet. The cellular phone may then request the configuration data and the pin from the computer. In response, the computer may send the configuration data and the pin to the cellular phone. Once received, the cellular phone may use the configuration data to configure itself. Further, cellular phone may prompt the user to enter a code to unlock the phone. After verifying that the entered code is the same as the pin, the cellular phone is ready for use.

In some instances, a graphical user interface may be referred to as an object-oriented user interface, an application oriented user interface, a web-based user interface, a touch-based user interface, or a virtual keyboard. A presence-sensitive input device as discussed herein, may be a device that accepts input by the proximity of a finger, a stylus, or an object near the device. Additionally, a presence-sensitive input device may be combined with a display to provide a presence-sensitive display. For example, a user may provide an input to a computing device by touching the surface of a presence-sensitive display using a finger. In another example, a user may provide input to a computing device by gesturing without physically touching any object. For example, a gesture may be received via a video camera or depth camera.

In some instances, a presence-sensitive display can have two main attributes. First, it may enable a user to interact directly with what is displayed, rather than indirectly via a pointer controlled by a mouse or touchpad. Secondly, it may allow a user to interact without requiring any intermediate device that would need to be held in the hand. Such displays may be attached to computers, or to networks as terminals. Such displays may also play a prominent role in the design of digital appliances such as the personal digital assistant (PDA), satellite navigation devices, mobile phones, and video games. Further, such displays may include a capture device and a display.

Figure 1:
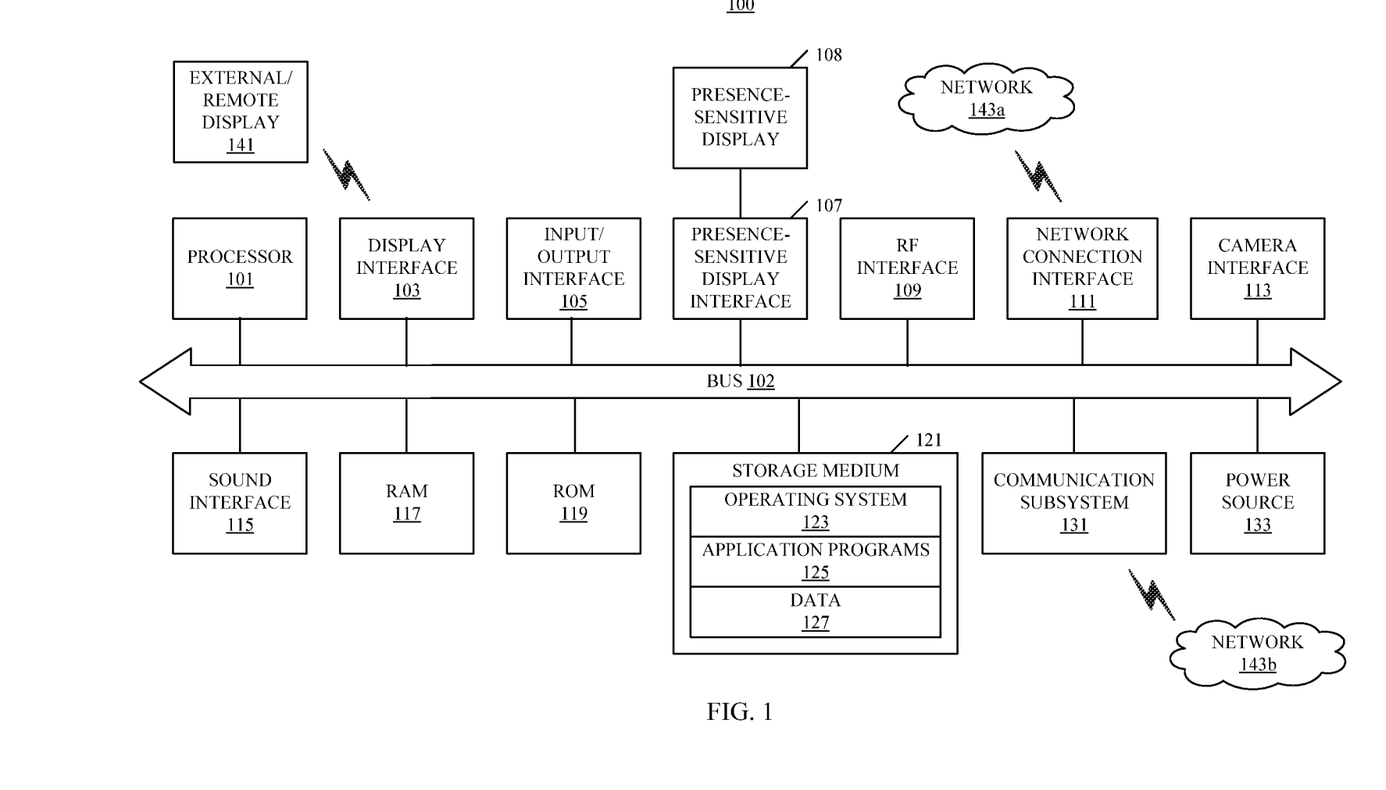
FIG. 1 is a block diagram illustrating one embodiment of a computing device in accordance with various aspects set forth herein.

According to one example implementation, the terms computing device or mobile computing device, as used herein, may be a central processing unit (CPU), controller or processor, or may be conceptualized as a CPU, controller or processor (for example, the processor 101 of FIG. 1). In yet other instances, a computing device may be a CPU, controller or processor combined with one or more additional hardware components. In certain example implementations, the computing device operating as a CPU, controller or processor may be operatively coupled with one or more peripheral devices, such as a display, navigation system, stereo, entertainment center, Wi-Fi access point, or the like. In another example implementation, the term computing device, as used herein, may refer to a mobile computing device, such as a smartphone, mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In an example embodiment, the computing device may output content to its local display or speaker(s). In another example implementation, the computing device may output content to an external display device (e.g., over Wi-Fi) such as a TV or an external computing system.

FIG. 1 is a block diagram illustrating one embodiment of a computing device 100 in accordance with various aspects set forth herein. In FIG. 1, the computing device 100 may be configured to include a processor 101, which may also be referred to as a computing device, that is operatively coupled to a display interface 103, an input/output interface 105, a presence-sensitive display interface 107, a radio frequency (RF) interface 109, a network connection interface 111, a camera interface 113, a sound interface 115, a random access memory (RAM) 117, a read only memory (ROM) 119, a storage medium 121, an operating system 123, an application program 125, data 127, a communication subsystem 131, a power source 133, another element, or any combination thereof. In FIG. 1, the processor 101 may be configured to process computer instructions and data. The processor 101 may be configured to be a computer processor or a controller. For example, the processor 101 may include two computer processors. In one definition, data is information in a form suitable for use by a computer. It is important to note that a person having ordinary skill in the art will recognize that the subject matter of this disclosure may be implemented using various operating systems or combinations of operating systems.

In FIG. 1, the display interface 103 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia interface (HDMI) port, a video port, an audio port, a Bluetooth port, a near-field communication (NFC) port, another like communication interface, or any combination thereof. In one example, the display interface 103 may be operatively coupled to a local display, such as a touch-screen display associated with a mobile device. In another example, the display interface 103 may be configured to provide video, graphics, images, text, other information, or any combination thereof for an external/remote display 141 that is not necessarily connected to the mobile computing device. In one example, a desktop monitor may be utilized for mirroring or extending graphical information that may be presented on a mobile device. In another example, the display interface 103 may wirelessly communicate, for example, via the network connection interface 111 such as a Wi-Fi transceiver to the external/remote display 141.

In the current embodiment, the input/output interface 105 may be configured to provide a communication interface to an input device, output device, or input and output device. The computing device 100 may be configured to use an output device via the input/output interface 105. A person of ordinary skill will recognize that an output device may use the same type of interface port as an input device. For example, a USB port may be used to provide input to and output from the computing device 100. The output device may be a speaker, a sound card, a video card, a display, a monitor, a printer, an actuator, an emitter, a smartcard, another output device, or any combination thereof. The computing device 100 may be configured to use an input device via the input/output interface 105 to allow a user to capture information into the computing device 100. The input device may include a mouse, a trackball, a directional pad, a trackpad, a presence-sensitive input device, a presence-sensitive display, a scroll wheel, a digital camera, a digital video camera, a web camera, a microphone, a sensor, a smartcard, and the like. The presence-sensitive input device may include a digital camera, a digital video camera, a web camera, a microphone, a sensor, or the like to sense input from a user. The presence-sensitive input device may be combined with a display to form a presence-sensitive display. Further, the presence-sensitive input device may be coupled to the computing device. The sensor may be, for instance, an accelerometer, a gyroscope, a tilt sensor, a force sensor, a magnetometer, an optical sensor, a proximity sensor, another like sensor, or any combination thereof. For example, the input device 115 may be an accelerometer, a magnetometer, a digital camera, a microphone, and an optical sensor.

In FIG. 1, the presence-sensitive display interface 107 may be configured to provide a communication interface to a pointing device or a presence-sensitive display 108 such as a touch screen. In one definition, a presence-sensitive display is an electronic visual display that may detect the presence and location of a touch, gesture, or object near its display area. In one definition, the term "near" means on, proximate or associated with. In another definition, the term "near" is the extended spatial location of. The RF interface 109 may be configured to provide a communication interface to RF components such as a transmitter, a receiver, and an antenna. The network connection interface 111 may be configured to provide a communication interface to a network 143a. The network 143a may encompass wired and wireless communication networks such as a local-area network (LAN), a wide-area network (WAN), a computer network, a wireless network, a telecommunications network, another like network or any combination thereof. For example, the network 143a may be a cellular network, a Wi-Fi network, and a near-field network. As previously discussed, the display interface 103 may be in communication with the network connection interface 111, for example, to provide information for display on a remote display that is operatively coupled to the computing device 100. The camera interface 113 may be configured to provide a communication interface and functions for capturing digital images or video from a camera. The sound interface 115 may be configured to provide a communication interface to a microphone or speaker.

In this embodiment, the RAM 117 may be configured to interface via the bus 102 to the processor 101 to provide storage or caching of data or computer instructions during the execution of software programs such as the operating system, application programs, and device drivers. In one example, the computing device 100 may include at least one hundred and twenty-eight megabytes (128 Mbytes) of RAM. The ROM 119 may be configured to provide computer instructions or data to the processor 101. For example, the ROM 119 may be configured to be invariant low-level system code or data for basic system functions such as basic input and output (I/O), startup, or reception of keystrokes from a keyboard that are stored in a non-volatile memory. The storage medium 121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives. In one example, the storage medium 121 may be configured to include an operating system 123, an application program 125 such as a web browser application, a widget or gadget engine or another application, and a data file 127.

In FIG. 1, the computing device 101 may be configured to communicate with a network 143b using the communication subsystem 131. The network 143a and the network 143b may be the same network or networks or different network or networks. The communication functions of the communication subsystem 131 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 131 may include cellular communication, Wi-Fi communication, Bluetooth communication, and GPS communication. The network 143b may encompass wired and wireless communication networks such as a local-area network (LAN), a wide-area network (WAN), a computer network, a wireless network, a telecommunications network, another like network or any combination thereof. For example, the network 143b may be a cellular network, a Wi-Fi network, and a near-field network. The power source 133 may be configured to provide an alternating current (AC) or direct current (DC) power to components of the computing device 100.

In FIG. 1, the storage medium 121 may be configured to include a number of physical drive units, such as a redundant array of independent disks (RAID), a floppy disk drive, a flash memory, a USB flash drive, an external hard disk drive, thumb drive, pen drive, key drive, a high-density digital versatile disc (HD-DVD) optical disc drive, an internal hard disk drive, a Blu-Ray optical disc drive, a holographic digital data storage (HDDS) optical disc drive, an external mini-dual in-line memory module (DIMM) synchronous dynamic random access memory (SDRAM), an external micro-DIMM SDRAM, a smartcard memory such as a subscriber identity module or a removable user identity (SIM/RUIM) module, other memory, or any combination thereof. The storage medium 121 may allow the computing device 100 to access computer-executable instructions, application programs or the like, stored on transitory or non-transitory memory media, to off-load data, or to upload data. An article of manufacture, such as one utilizing a communication system may be tangibly embodied in storage medium 122, which may comprise a computer-readable medium.

Figure 2:
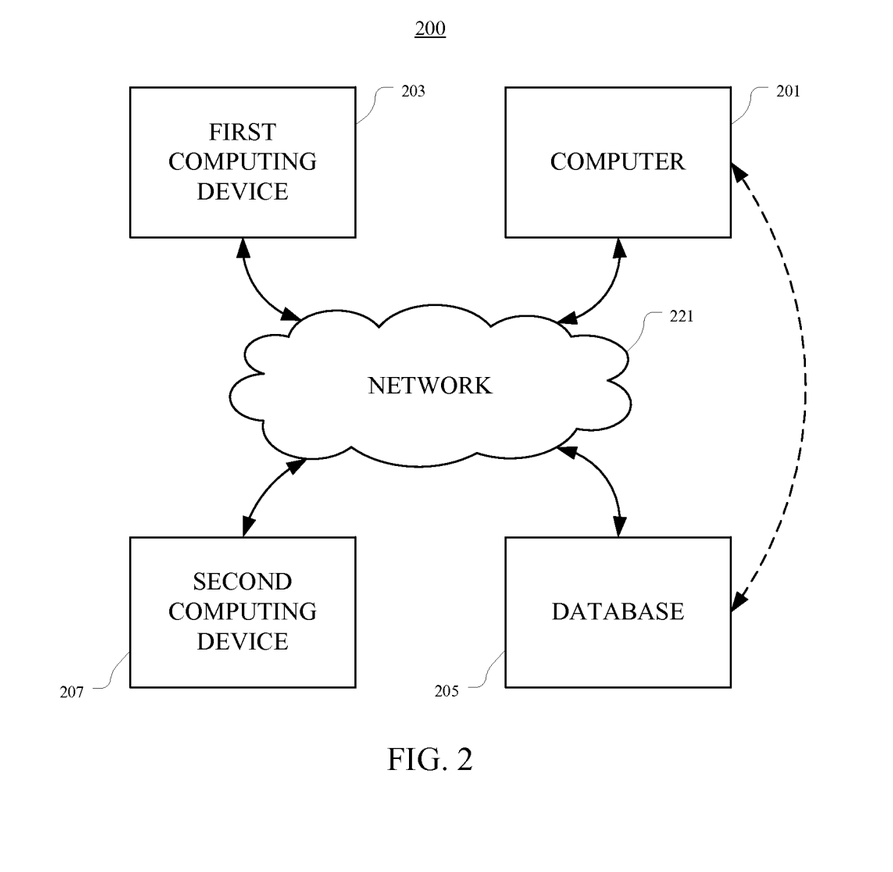
FIG. 2 is one embodiment of a system for remote device configuration in accordance with various aspects set forth herein.

FIG. 2 is one embodiment of a system 200 for remote device configuration in accordance with various aspects set forth herein. In FIG. 200, the system 200 may be configured to include a computer 201 such as a server, a first computing device 203, a database 205, and a second computing device 207. The computer 201 may be configured to include a computer software system. In one example, the computer 201 may be a computer software system executing on computer hardware system. The computer 201 may execute one or more services. Further, the computer 201 may include one more computer programs running to serve requests or provide data to local computer programs executing on the computer 201 or remote computer programs executing on computing devices. The computer 201 may be capable of performing functions associated with a database server, a file server, a mail server, a print server, a web server, a gaming server, the like, or any combination thereof, whether in hardware or software. In one example, the computer 201 may be a web server. In another example, the computer 201 may be a file server. The computer 201 may be configured to process requests or provide data to computing devices over a network 221. The network 221 may encompass wired or wireless communication networks such as a local-area network (LAN), a wide-area network (WAN), a computer network, a wireless network, a telecommunications network, another like network, the like, or any combination thereof. For example, the network 221 may include the Internet, a cellular network and a Wi-Fi network. The database 203 may refer to a collection of data and supporting data structures. Further, the database 205 may include a computer. In one example, the database 205 may be a collection of data managed by a computer. In another example, the database 205 may be integrated with the computer 201.

In FIG. 2, the first computing device 203 may refer to a mobile computing device, such as a smartphone, mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or the like. Similarly, the second computing device 207 may refer to a mobile computing device, such as a smartphone, mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or the like.

In the current embodiment, the computer 201 may provide configuration options for the second computing device 207 to a first computing device 203. The configuration options may include various options associated with a setting, an account, an application, a library, music, a video, the like, or any other configuration data that may be modified by a user of the second computing device 207. In one example, the configuration options may be associated with and include Internet connectivity, Wi-Fi connectivity, Bluetooth connectivity, a user account, a backup configuration, payment information, device personalization such as a wallpaper, ringtone, font size or the like, and applications. In addition, the configuration options may allow for selection of one or more versions of these various options.

Furthermore, the configuration options may be provided or presented to include various input elements such as a text field, a checkbox, a password, a radio button, a submit button, the like, or any combination thereof. In one example, the first computing device 203 may access the configuration options for the second computing device 207 via a web page hosted by the computer 201, an e-mail sent from the computer 201 to the first computing device 203, an application executing on the first computing device 203 that is in communication with the computer 201, or the like. In response, the first computing device 203 may output configuration data associated with the configuration options for the second computing device 207 to the computer 201. For example, the first computing device 203 may output the configuration options for the second computing device 207 to the computer 201 via a web page hosted by the computer 201, an e-mail sent from the computing device 207 to the sever 201, an application executing on the second computing device 207 that is in communication with the computer 201, or the like. The configuration data for the second computing device 207 may include a setting, an account, an application, a library, music, a video, the like, or any other configuration data that may be modifiable by a user of the second computing device 207.

Furthermore, the computer 201 may output to the first computing device 203 via the network 221 a request for a first security identifier for the second computing device 207. In response, the first computing device 203 may output to the computer 201 the first security identifier. In one example, the first security identifier is a pin, a gesture, a pattern, an image, the like, or an identifier that is capable of securely unlocking the second computing device 207. In another example, the first security identifier is a four-digit pin. In another example, the first security identifier is an image of a user that may be used to unlock the second computing device 207 by using facial recognition. In another example, the first security identifier may be a pattern entered by a user.

Prior to outputting a request to the computer 201 for the configuration data or the first security identifier, the second computing device 207 may establish communication with the computer. The second computing device 207 may output, for display, a request for network connectivity information. In response to the request for network connectively information, the second computing device 207 may receive the network connectivity information. Once the communication with the computer 201 is established, the second computing device 207 may send a request to the computer for the configuration data, the first security identifier, or both. In response, the computer 201 may send the configuration data, the first security identifier, or both to the second computing device 207. Once the configuration data is received, the second computing device 207 may use the configuration data to configure itself. Further, once the first security identifier is received, the second computing device 207 may output, for display, a request to provide a second security identifier. After determining that the second security identifier is the same as the first security identifier, the second computing device 207 may be ready for use.

In another embodiment, the computer 201 may access a database 205 to obtain identification data of the second computing device 207. The identification data may include information unique to a computing device. Further, the identification data may be used to identify and authenticate the computing device on a network. In one example, the identification data may be the same as or similar to the data contained in a subscriber identification module (SIM). In response to a request for the identification data of the second computing device 207, the computer 201 may output to the second computing device 207 the identification data of the second computing device 207.

In another embodiment, the computer 201 may generate and output a first security identifier for the second computing device 207 to the first computing device 203. In one example, the computer 201 may output the first security identifier to the first computing device 203 via a web page hosted by the computer 201, an e-mail sent from the computer 201 to the first computing device 207, an application executing on the second computing device 207 that is in communication with the computer 201, or the like.

In another embodiment, once the communication with the computer 201 is established, the second computing device 207 may send a request to the computer 201 for the configuration data. Further, the second computing device 207 may provide to the computer 201 a second security identifier. In response to the request, the computer 201 may determine that the first security identifier is the same as the second security identifier. Further, in response to determining that the first security identifier is the same as the second security identifier, the computer 201 may send the configuration data to the second computing device 207. Once the configuration data is received, the second computing device 207 may use the configuration data to configure itself.

Figure 3:
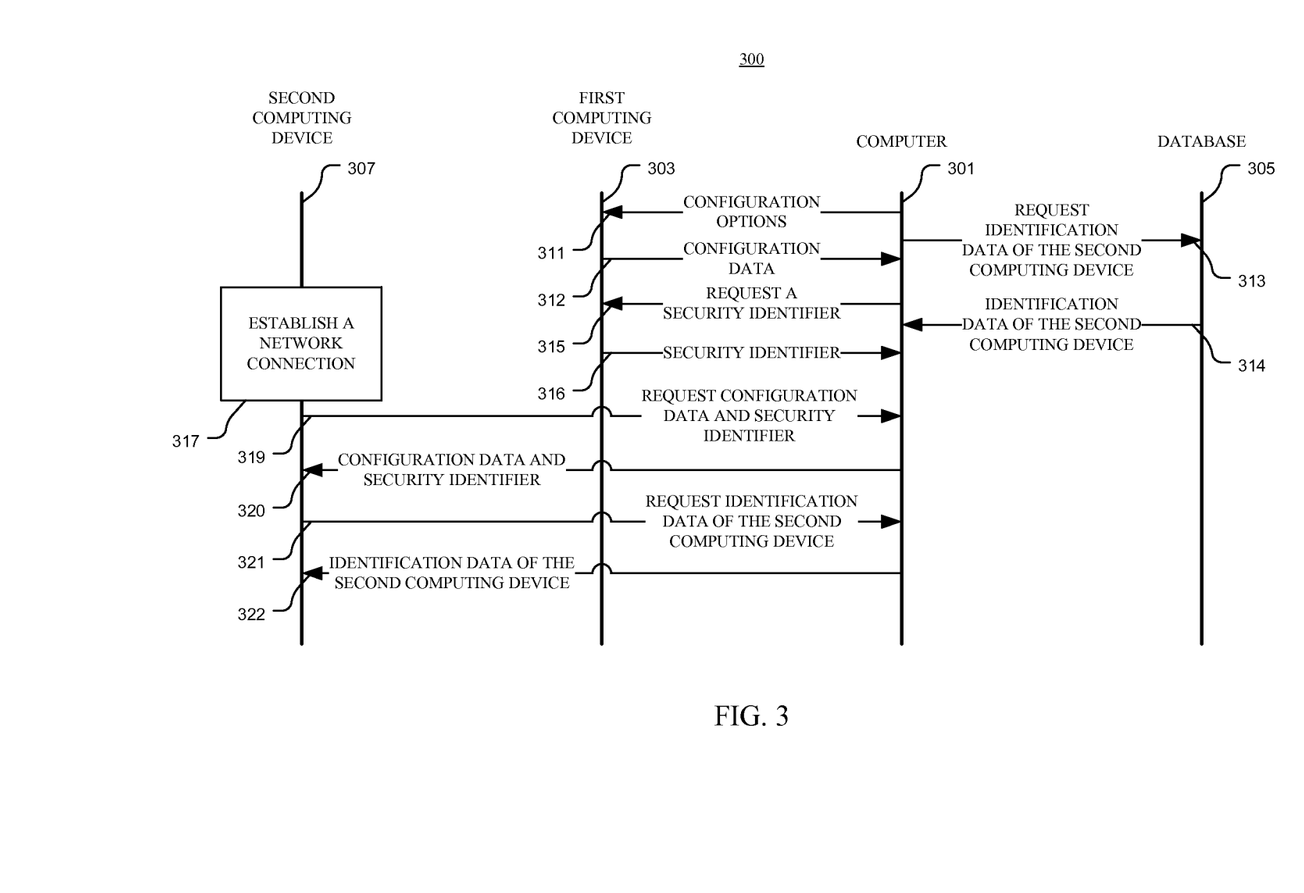
FIG. 3 is a ladder diagram showing example signals that can be exchanged to perform remote device configuration with various aspects described herein.

FIG. 3 is a ladder diagram 300 showing example signals that may be exchanged for remote device configuration with various aspects described herein. In FIG. 3, the ladder diagram 300 includes a computer 301 such as a server, a first computing device 303, a database 305 and a second computing device 307. The ladder diagram 300 shows example signals that may be used to allow the first computing device 303 to access the computer 301 to pre-configure settings of the second computing device 307. In FIG. 3, the computer 301 may send to the first computing device 303 a signal having configuration options 311. In response, the first computing device 303 may send to the computer 301 a signal having configuration data 312. Further, the computer 301 may send to the first computing device 303 a signal to request a first security identifier 315. In response, the first computing device 303 may send to the computer 301 a signal having a first security identifier 316. The second computing device 307 may establish a network connection to the computer 301, as described by reference number 317. Once the network connection to the computer 301 is established, the second computing device 307 may send a signal to request the configuration data and the first security identifier 319 from the computer 301. In response, the computer 301 may send a signal having the configuration data and the first security identifier 320.

In another embodiment, the computer 301 may send to the database 305 a signal to request identification data of the second computing device 313. In response, the database 305 may send to the computer 301 a signal having the identification data of the second computing device 314. Once the second computing device 307 has established a network connection to the computer 301, as described by reference number 317, the second computing device 307 may send a signal to request identification data of the second computing device 307, as described by reference number 321. In response, the computer 301 may send a signal having the identification data of the second computing device 307, as described by reference number 322.

Figure 4:
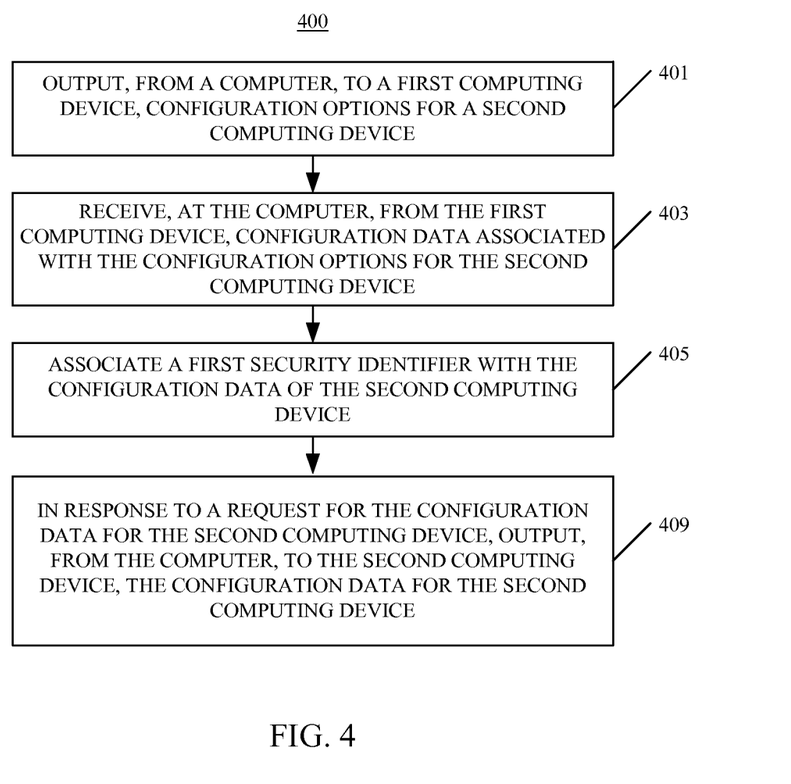
FIG. 4 is a flow chart illustrating one embodiment of a method for remote device configuration with various aspects described herein.

FIG. 4 is a flow chart illustrating one embodiment of a method 400 for remote device configuration with various aspects described herein. In FIG. 4, the method 400 may start at, for instance, block 401, where the method 400 may output, from a computer such as a server, to a first computing device, configuration options for a second computing device. At block 403, the method 400 may receive, at the computer, from the first computing device, configuration data associated with the configuration options for the second computing device. At block 405, the method 400 may associate a first security identifier with the configuration data of the second computing device. In one example, the method 400 may output, from the computer, to the first computing device, a request for the first security identifier for the second computing device. Further, the method 400 may receive, at the computer, from the first computing device, the first security identifier for the second computing device. In response to the request for the configuration data for the second computing device, the method 400 may output, to the second computing device, the first security identifier for the second computing device. In another example, the method 400 may determine the first security identifier. Further, the method 400 may output, from the computer, to the first computing device, the first security identifier for the second computing device. In response to the request for the configuration data for the second computing device, the method 400 may output, to the second computing device, the first security identifier for the second computing device. In another example, the method 400 may receive, at the computer, from the second computing device, a second security identifier for the second computing device. Further, the method 400 may determine that the second security identifier is the same as the first security identifier. In response to determining that the second security identifier is the same as the first security identifier, the method 400 may output, from the computer, to the first computing device, the configuration data for the second computing device. At block 409, in response to a request for the configuration data and the first security identifier for the second computing device, the method 400 may output, from the computer, to the second computing device, the configuration data and the first security identifier for the second computing device.

Figure 5:
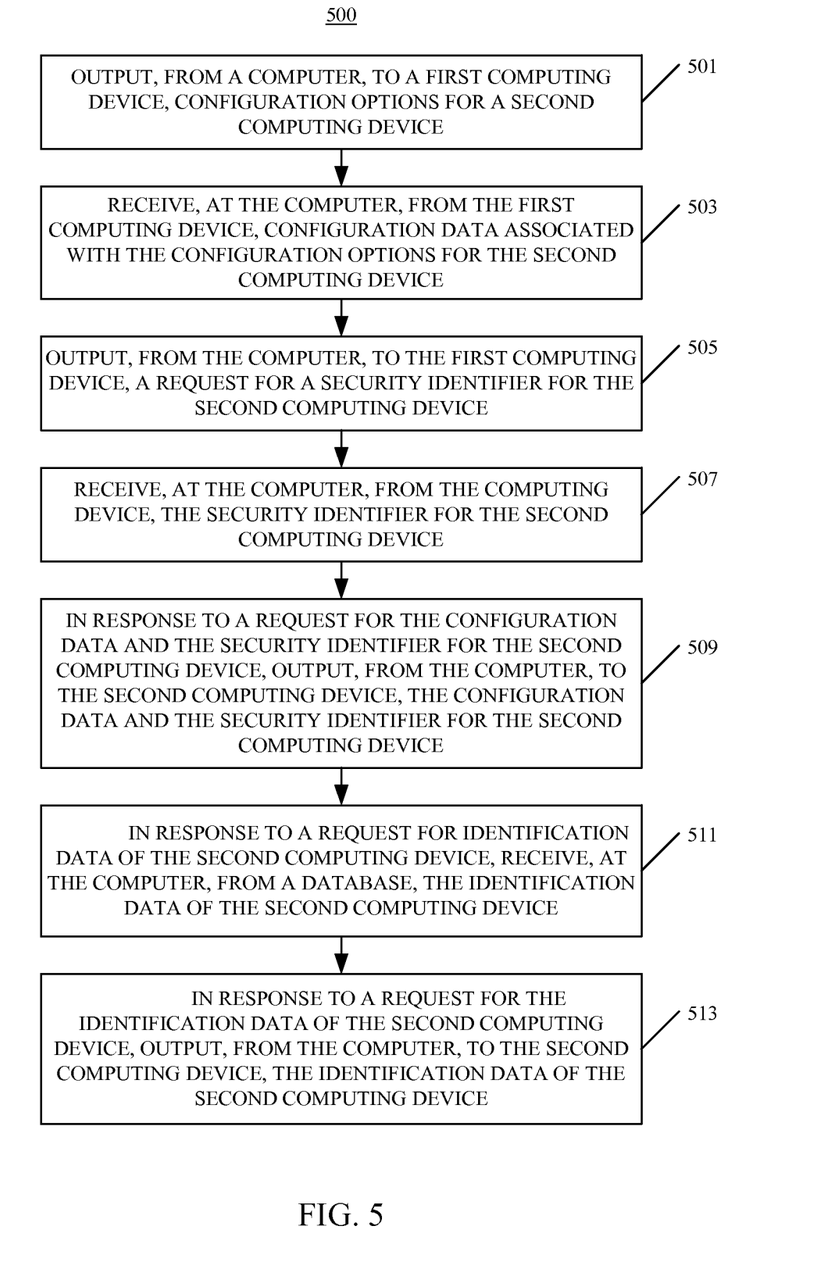
FIG. 5 is a flow chart illustrating another embodiment of a method for remote device configuration with various aspects described herein.

FIG. 5 is a flow chart illustrating another embodiment of a method 500 for remote device configuration with various aspects described herein. In FIG. 5, the method 500 may start at, for instance, block 501, where the method 500 may output, from a computer such as a server, to a first computing device, configuration options for a second computing device. At block 503, the method 500 may receive, at the computer, from the first computing device, configuration data associated with the configuration options for the second computing device. At block 505, the method 500 may output, from the computer, to the first computing device, a request for a first security identifier for the second computing device. At block 507, the method 500 may receive, at the computer, from the computing device, the first security identifier for the second computing device. At block 509, in response to a request for the configuration data and the first security identifier for the second computing device, the method 500 may output, from the computer, to the second computing device, the configuration data and the first security identifier for the second computing device. At block 511, in response to a request for identification data of the second computing device, the method 500 may receive, at the computer, from a database, the identification data of the second computing device. At block 513, in response to a request for the identification data of the second computing device, the method 500 may output, from the sever, to the second computing device, the identification data of the second computing device.

The previous detailed description is merely illustrative in nature and is not intended to limit the present disclosure, or the application and uses of the present disclosure. Furthermore, there is no intention to be bound by any expressed or implied theory presented in the preceding field of use, background or summary of the disclosure or the following detailed description. The present disclosure provides various examples, embodiments and the like, which may be described herein in terms of functional or logical block elements. Various techniques described herein may be used for remote device configuration. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware, or any combination thereof to control a computing device to implement the disclosed subject matter. The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Throughout the specification and the claims, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or." Further, the terms "a," "an," and "the" are intended to mean one or more unless specified otherwise or clear from the context to be directed to a singular form. The term "include" and its various forms are intended to mean including but not limited to.

In the previous description, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

It is important to recognize that it is impractical to describe every conceivable combination of components or methodologies for purposes of describing the claimed subject matter. However, a person having ordinary skill in the art will recognize that many further combinations and permutations of the subject innovations are possible. Accordingly, the claimed subject matter is intended to cover all such alterations, modifications and variations that are within the spirit and scope of the claimed subject matter.

Although the present disclosure describes specific examples, embodiments, and the like, various modifications and changes may be made without departing from the scope of the present disclosure as set forth in the claims below. For example, although the example methods, devices, systems, or articles of manufacture described herein are in conjunction with remote device configuration, the skilled artisan will readily recognize that the example methods, devices, systems, or articles of manufacture may be used in other methods, devices, systems, or articles of manufacture and may be configured to correspond to such other example methods, devices, systems, or articles of manufacture as needed. Further, while at least one example, embodiment, or the like has been presented in the foregoing detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all of the claims. Any benefits, advantages, or solutions to problems that are described herein with regard to specific examples, embodiments, or the like are not intended to be construed as a critical, required, or essential feature or element of any or all of the claims.

What is claimed is:

1. A method, comprising:
   outputting, from a computer, to a first computing device, configuration options for a second computing device, and from the computer to a database, a request for identification data of the second computing device;
   receiving, at the computer, from the first computing device, configuration data associated with the configuration options for the second computing device, and from the database, the identification data of the second computing device;
   associating a first security identifier with the configuration data for the second computing device; and
   in response to a request, from the second computing device, for the identification data of the second computing device and for the configuration data for the second computing device, outputting, from the computer, to the second computing device, the identification data of the second computing device and the configuration data for the second computing device.

2. The method of claim 1, wherein associating a first security identifier with the configuration data for the second computing device comprises:
   outputting, from the computer, to the first computing device, a request for the first security identifier for the second computing device;
   receiving, at the computer, from the first computing device, the first security identifier for the second computing device; and
   in response to the request for the configuration data for the second computing device, outputting, to the second computing device, the first security identifier for the second computing device.

3. The method of claim 1, wherein associating a first security identifier with the configuration data for the second computing device comprises:
   generating, by the computer, the first security identifier;
   outputting, from the computer, to the first computing device, the first security identifier for the second computing device; and
   in response to the request for the configuration data for the second computing device, outputting, to the second computing device, the first security identifier for the second computing device.

4. The method of claim 1, further comprising:
   receiving, at the computer, from the second computing device, a second security identifier for the second computing device; and
   in response to determining that the second security identifier is the same as the first security identifier, outputting, from the computer, to the second computing device, the configuration data for the second computing device.

5. The method of claim 1, wherein the configuration data includes one or more accounts for the second computing device.

6. The method of claim 1, wherein the configuration data includes one or more device policies for the second computing device.

7. The method of claim 1, wherein the configuration data includes one or more settings for the second computing device.

8. The method of claim 1, wherein the configuration data includes one or more applications for the second computing device.

9. A system, comprising:
   a computer configured to:
      output, to a first computing device, configuration options for a second computing device and, to a database, a request for identification data of the second computing device;
      receive, from the first computing device, configuration data associated with the configuration options for the second computing device and, from the database, the identification data of the second computing device;
      associate a first security identifier with the configuration data for the second computing device; and
      in response to a request, from the second computing device, for the identification data of the second computing device and for the configuration data for the second computing device, output, to the second computing device, the identification data of the second computing device and the configuration data for the second computing device;
   the first computing device configured to:
      receive, from the computer, the configuration options for the second computing device; and
      output, to the computer, the configuration data associated with the configuration options for the second computing device; and
   the second computing device configured to:
      output, to the computer, the request for the identification data of the second computing device and the configuration data for the second computing device; and
      receive, from the computer, the identification data of the second computing device and the configuration data for the second computing device.

10. The system of claim 9, wherein the computer is further configured to:
    output to the first computing device, a request for the first security identifier for the second computing device;
    receive from the first computing device, the first security identifier for the second computing device; and in response to the request for the configuration data for the second computing device, output, to the second computing device, the first security identifier for the second computing device;

wherein the first computing device is further configured to:

receive, from the computer, the request for the first security identifier for the second computing device; and output, to the computer, the first security identifier for the second computing device; and wherein the second computing device is further configured to:

receive, from the computer, the first security identifier for the second computing device.

11. The system of claim 9, wherein the computer is further configured to:

generate the first security identifier; and output, to the first computing device, the first security identifier for the second computing device; and wherein the first computing device is further configured to:

receive, from the computer, the first security identifier for the second computing device.

12. The system of claim 9, wherein the second computing device is further configured to provide, to the computer, a second security identifier for the second computing device; and wherein the computer is further configured to:

receive, from the second computing device, the second security identifier for the second computing device; and in response to determining that the second security identifier is the same as the first security identifier, output, to the first computing device, the configuration data for the second computing device.

13. The system of claim 9, wherein the second computing device is further configured to:

output, for display, a request for network connectivity data;

receive the network connectivity data; and prior to outputting the request for the configuration data for the second computing device, establish communication with a network using the network connectivity data.

14. A non-transitory computer-readable medium encoded with a computer program, the computer program comprising computer-executable instructions that when executed by a computer having at least one processor causes the computer to perform, a method comprising:

outputting, from a computer, to a first computing device, configuration options for a second computing device, and from the computer to a database, a request for identification data of the second computing device;

receiving, at the computer, from the first computing device, configuration data associated with the configuration options for the second computing device, and from the database, the identification data of the second computing device;

outputting, from the computer, to the first computing device, a request for a first security identifier for the second computing device;

receiving, at the computer, from the first computing device, the first security identifier for the second computing device; and in response to a request for the configuration data and the first security identifier for the second computing device, outputting, from the computer, to the second computing device, the configuration data and the first security identifier for the second computing device.

15. The non-transitory computer-readable medium of claim 14, the method further comprising:

in response to a request, from the second computing device, for the identification data for the second computing device, outputting, from the computer, to the second computing device, the identification data for the second computing device.

16. The non-transitory computer-readable medium of claim 14, the method further comprising:

receiving, at the computer, from the second computing device, a second security identifier for the second computing device; and in response to determining that the second security identifier is the same as the first security identifier, outputting, from the computer, to the first computing device, the configuration data for the second computing device.

* * * * *